United States Patent
Kikuchi et al.

(10) Patent No.: US 9,431,879 B2
(45) Date of Patent: Aug. 30, 2016

(54) GENERATOR MOTOR AND ELECTRIC VEHICLE USING SAME

(75) Inventors: Satoshi Kikuchi, Ibaraki (JP); Seiji Ishida, Hitachinaka (JP); Tsutomu Miyoshi, Chiba (JP); Itsuro Sawada, Hitachinaka (JP); Makoto Ishijima, Omitama (JP); Shigenori Aoki, Kasumigaura (JP)

(73) Assignees: HITACHI CONSTRUCTION MACHINERY CO., LTD., Tokyo (JP); HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 142 days.

(21) Appl. No.: 14/237,033

(22) PCT Filed: Aug. 13, 2012

(86) PCT No.: PCT/JP2012/070636
§ 371 (c)(1),
(2), (4) Date: Feb. 4, 2014

(87) PCT Pub. No.: WO2013/042490
PCT Pub. Date: Mar. 28, 2013

(65) Prior Publication Data
US 2014/0217842 A1 Aug. 7, 2014

(30) Foreign Application Priority Data
Sep. 20, 2011 (JP) .................. 2011-204848

(51) Int. Cl.
*H02K 9/20* (2006.01)
*H02K 9/00* (2006.01)
(Continued)

(52) U.S. Cl.
CPC ............. *H02K 9/19* (2013.01); *B60L 2200/00* (2013.01); *H02K 3/24* (2013.01); *H02K 5/161* (2013.01); *H02K 9/005* (2013.01); *Y02T 10/641* (2013.01); *Y02T 90/16* (2013.01)

(58) Field of Classification Search
CPC ........................................................ H02K 9/19
USPC ........................................ 310/52, 54, 58, 59
See application file for complete search history.

(56) References Cited

U.S. PATENT DOCUMENTS

| | | | | |
|---|---|---|---|---|
| 2010/0052441 A1* | 3/2010 | Fukushima | .............. | H02K 9/19 310/54 |
| 2010/0219008 A1* | 9/2010 | Isaka | ..................... | B60K 11/04 180/68.1 |

(Continued)

FOREIGN PATENT DOCUMENTS

| | | |
|---|---|---|
| JP | 6-36363 | 5/1994 |
| JP | 2001-8413 | 1/2001 |

(Continued)

*Primary Examiner* — Jose Gonzalez Quinone
(74) *Attorney, Agent, or Firm* — Baker Botts L.L.P.

(57) ABSTRACT

To uniformly cool down armature windings along the circumferential direction of a stator in a generator motor. A generator motor includes a stator 1 fixed to the inner diameter side of a housing 18, a rotor 130 rotatably supported by bearings 5, and armature windings wound around the teeth of a stator core 110. Each of brackets 200 provided via the bearings 5 has a passage 201, 202 through which cooling oil flows and injection holes 204 which communicate with the passage and inject cooling oil at positions opposite to winding ends of the armature windings. Cooling oil is injected toward the winding ends of the armature windings from the injection holes 204 of the brackets 200 arranged on opposite axial sides of a shaft 6. In the flow rate distribution of the oil from the plurality of the injection holes 204, the flow rate of the oil from any of the injection holes 204 is set to be greater as the position of the injection hole 204 is higher above the level of the shaft 6. The arrangement pitch among the injection holes 204 provided on each of the brackets 200 is dense in a vertically upper portion of the bracket 200, and gradually sparser in a portion thereof closer to the level of shaft 6.

6 Claims, 15 Drawing Sheets

(51) Int. Cl.
*H02K 9/19* (2006.01)
*H02K 5/16* (2006.01)
*H02K 3/24* (2006.01)

(56) References Cited

U.S. PATENT DOCUMENTS

| | | | | |
|---|---|---|---|---|
| 2010/0277016 A1* | 11/2010 | Dang | ............... | H02K 1/20 310/54 |
| 2010/0320851 A1* | 12/2010 | Lambka | ............... | H02K 5/20 310/54 |
| 2011/0148229 A1* | 6/2011 | Esse | ............... | H02K 9/19 310/54 |

FOREIGN PATENT DOCUMENTS

| | | |
|---|---|---|
| JP | 2010-57261 | 3/2010 |
| JP | 2010-130794 | 6/2010 |
| JP | 2010-148272 | 7/2010 |
| JP | 2010-252502 | 11/2010 |
| JP | 2011-35992 | 2/2011 |
| JP | 2011-93424 | 5/2011 |
| WO | WO 2008/015798 A1 | 2/2008 |

* cited by examiner

SECTIONAL VIEW TAKEN ALONG
LINE OF ARROWS A-A' IN FIG. 1

SECTIONAL VIEW TAKEN ALONG
LINE OF ARROWS B-B' IN FIG. 10

GENERATOR MOTOR AND ELECTRIC VEHICLE USING SAME

TECHNICAL FIELD

The present invention relates to a generator motor in which field permanent magnets are provided in a rotor. Particularly, it relates to a permanent magnet type generator motor for an electric vehicle, which motor is driven under a high temperature environment.

BACKGROUND ART

Permanent magnet type rotary electric machines have been improved in terms of performance rapidly with the development of high residual magnetic flux density magnets. For this reason, the permanent magnet type rotary electric machines have been used in all phases. Particularly, high energy efficiency has been requested for electric motors for industrial use or for household use in view of recent environmental regulations. Thus, the application ratio of the permanent magnet type electric motors tends to be extremely high.

In addition, since a highly efficient system configuration can be attained as an auxiliary motive power source for an engine or a transmission in an electric motor for a vehicle, the application ratio of a permanent magnet synchronous electric motor is high and it is positioned as an essential component.

On the other hand, in construction machines vehicles, due to a severe request for transformation into an eco-friendly type, reduction in fuel consumption based on motorization is an absolute must. Here, an electric motor for a construction machine vehicle, particularly for a hydraulic excavator has to serve as a generator motor for supplying auxiliary motive power to an engine and a hydraulic pump and supplying electric power to all electric components disposed inside the vehicle. In addition, due to the configuration in which the electric motor is placed in a small space between the engine and the hydraulic pump, the electric motor inevitably has to be designed to achieve reduction in size and increase in output density (to be designed to achieve increase in output power per unit volume). Further, since the electric motor is operated with a high output under a high temperature environment due to heat transfer from the engine and the hydraulic pump, it is necessary to pay special care to a cooling configuration in the electric motor.

According to a concept of a generator motor in which special care is paid to a cooling configuration for a construction machine vehicle represented by a hydraulic excavator, a permanent magnet type synchronous motor can be formed to have a configuration with high efficiency and with a small amount of heat generation. It is, however, essential to use another cooling means so that the generator motor can be driven under an environment where the generator motor placed in the small space between the engine and the hydraulic pump is apt to be affected by heat transfer from the engine and the hydraulic pump.

To this end, a means for forcibly cooling down the generator motor, particularly for directly cooling down the generator motor with oil is the most suitable. A background-art structure in which oil directly cools down the generator motor has been proposed, for example, in Patent Literature 1. According to the Patent Literature 1, cooling oil forcibly circulated is injected to center portions of slots through an oil passage provided in a bracket holding the motor, that is, among motor windings. With this configuration, the windings can be cooled down along an axial direction of the motor.

CITATION LIST

Patent Literature

Patent Literature 1: JP-A-2010-57261

SUMMARY OF INVENTION

Technical Problem

However, in the background-art technique disclosed in the Patent Literature 1, injection holes for the cooling oil are present on only one side in the axial direction so that the injected cooling oil can flow in the axial direction among the windings. Due to this structure, there is a possibility that a variation may occur in the temperature distribution of the windings in the axial direction.

In addition, when the cooling oil is injected among the windings (into the centers of the slots), the windings become obstacles on a cooling path in the motor with a high winding space factor. Accordingly, there is a fear that the axial flow of the cooling oil is limited so that a variation may occur in the temperature distribution among the windings, that is, in the temperature distribution in the circumferential direction, causing local heating.

An object of the invention is to provide a cooling structure which can enhance a cooling effect of a generator motor disposed in a limited small space under a high temperature environment in consideration of the fact that the generator motor is applied to a construction machine vehicle, and which can achieve both reduction in size and increase in output density to thereby cool down armature windings uniformly particularly in a circumferential direction of a stator of the generator motor.

Solution to Problem

In order to solve the problem, the invention mainly uses the following configuration.

A generator motor including: a stator which is fixed to an inner diameter side of a housing; a rotor which is disposed to be opposed to an inner circumferential side of the stator and which is supported by bearings rotatably; and armature windings which are wound around teeth of a stator core, which teeth are adjacent to slots; wherein: a passage through which a cooling medium flows and injection holes which communicate with the passage and which inject the cooling medium at positions opposite to winding ends of the armature windings are provided in each of brackets provided through the bearings; the cooling medium is injected from the injection holes of the brackets disposed on axially opposite sides of the shaft toward the winding ends of the armature windings; and the flow rate distribution of the cooling medium from the plurality of injection holes is set so that the flow rate of the cooling medium from any of the injection holes is higher as the position of the injection hole is higher above the level of the shaft.

In the generator motor, the arrangement pitch among the injection holes provided on each of the brackets is dense in a vertically upper portion of the bracket and gradually sparser in a portion thereof closer to the level of shaft. Further, the hole diameters of the injection holes provided on each of the brackets are large in a vertically upper portion of the bracket, and gradually smaller in a portion thereof closer to the level of the shaft. Further, the number of injection holes provided at positions opposite to the winding ends of the armature windings is large in a vertically upper portion of the bracket and gradually smaller in a portion thereof closer to the level of the shaft. An electric vehicle including: the generator motor; an engine which has an internal combustion engine portion connected to a shaft of the generator motor; and a hydraulic pump which has a hydraulic mechanism portion connected to the shaft of the generator motor and disposed on an opposite side to the engine.

Advantageous Effects of Invention

According to the invention, the armature windings of the generator motor can be uniformly cooled down in the circumferential direction of the stator so that the cooling effect can be enhanced. In addition, when the generator motor is applied to an electric vehicle such as a hydraulic excavator, it is possible to more greatly enhance the cooling effect required under the condition that the generator motor is disposed in a small space in a high temperature environment and it is possible to contribute to both reduction in size and increase in output density.

DESCRIPTION OF EMBODIMENTS

Generator motors according to embodiments of the invention and electric vehicles using the same will be described based on the following examples and with reference to the drawings.

Example 1

Figure 1:
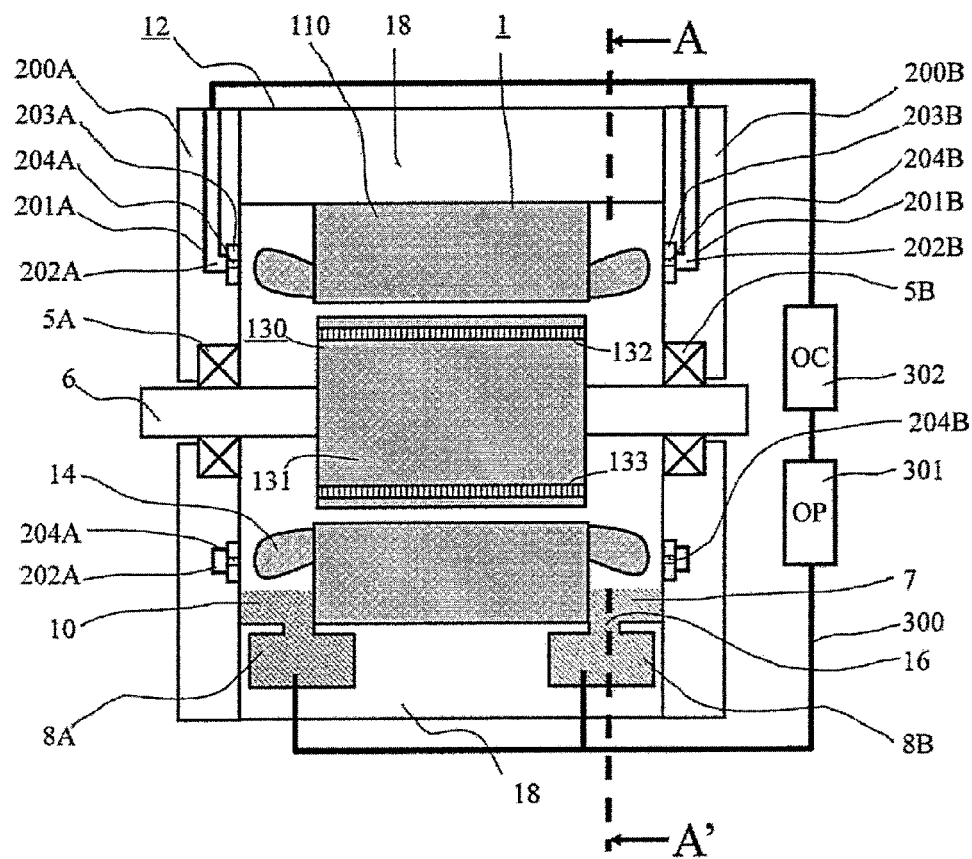
FIG. 1 An axially sectional view showing an overall configuration of a generator motor according to a first example of the invention.
Figure 2:
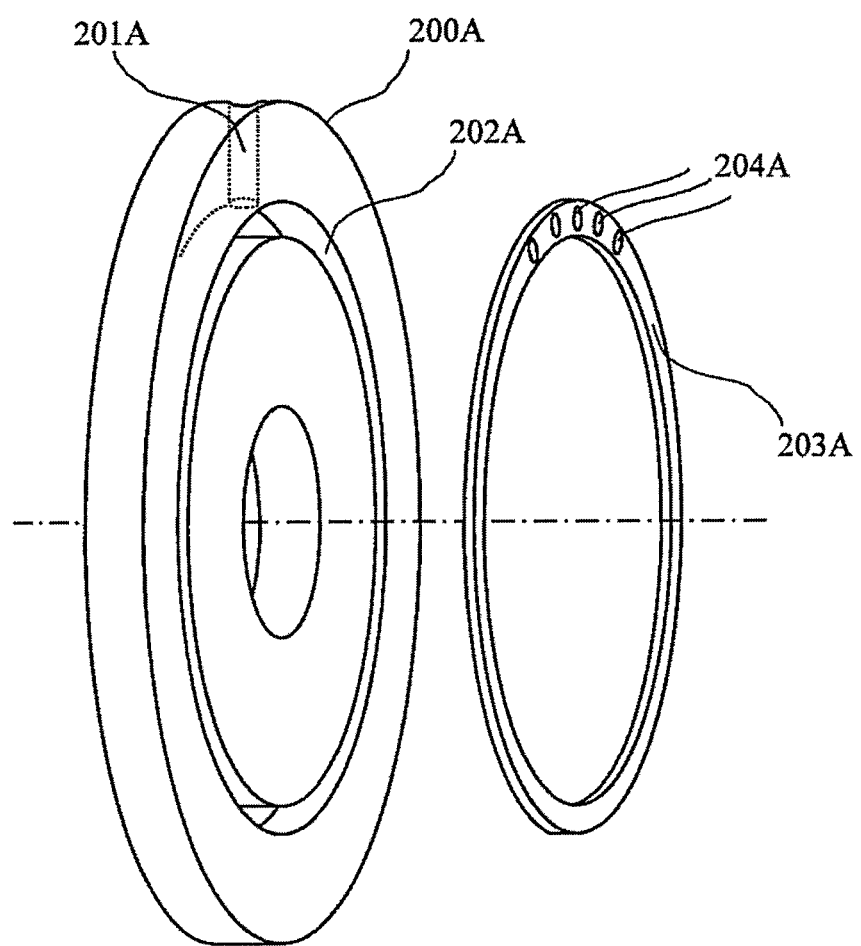
FIG. 2 An exploded view showing an oil passage inside a bracket in the generator motor according to the first example.
Figure 3:
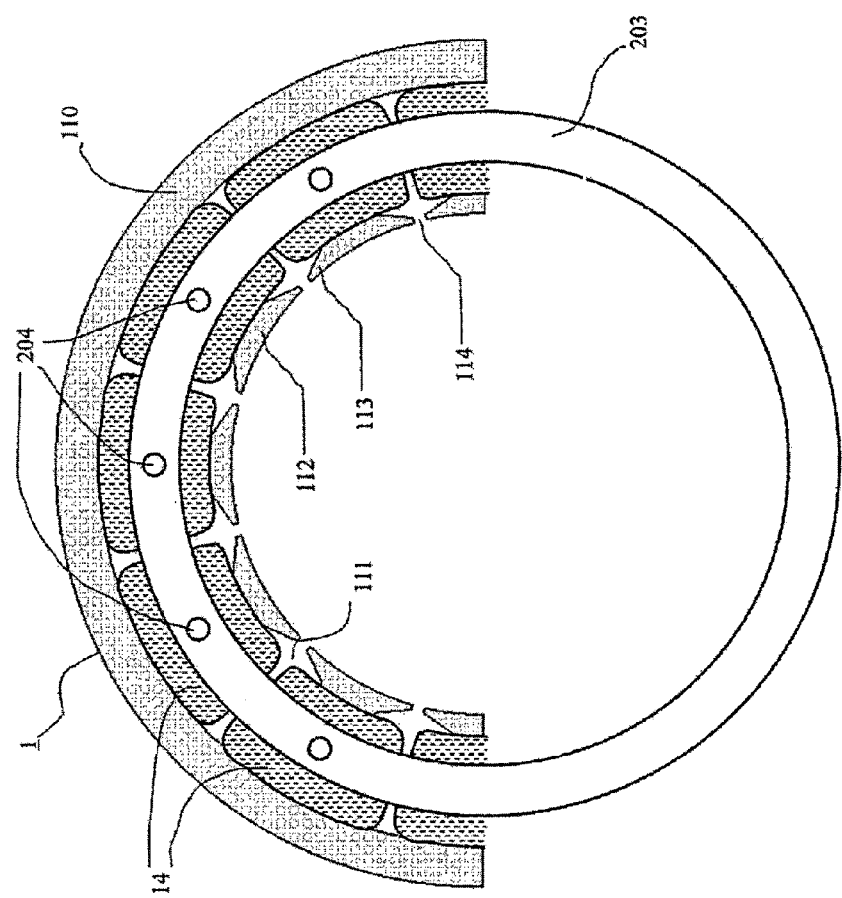
FIG. 3 A sectional view showing the relation between armature windings and positions of oil injection holes in the generator motor according to the first example.
Figure 4:
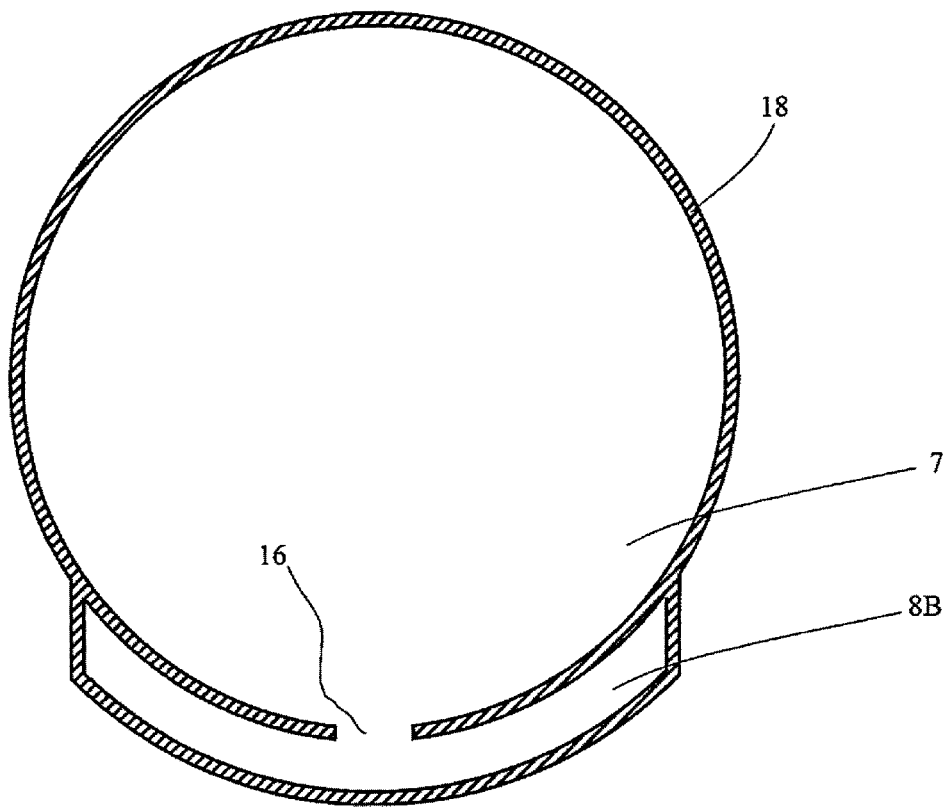
FIG. 4 An axially vertical sectional view, which is a sectional view taken along the line of arrows A-A' in FIG. 1, showing a housing and an auxiliary oil reservoir portion in the generator motor according to the first example.
Figure 5:
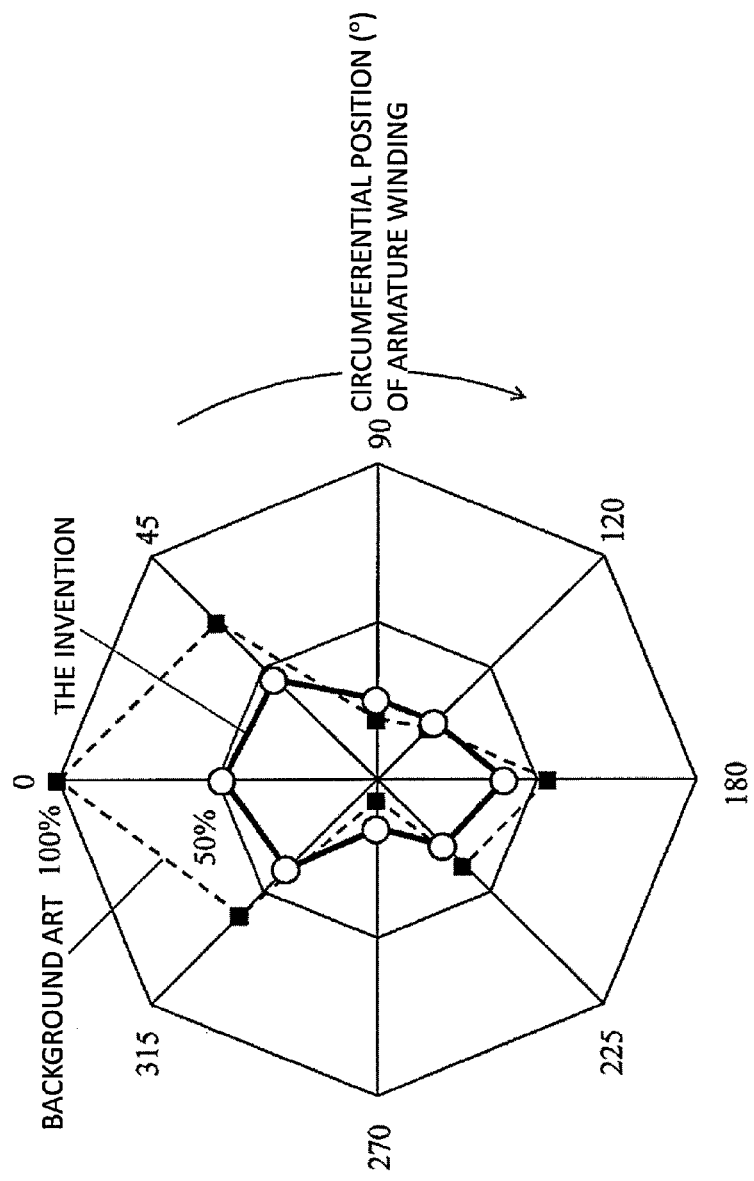
FIG. 5 A graph showing a measurement result of the temperature distribution of the armature windings in the generator motor according to the first example.

A generator motor according to a first example of the invention will be described below in detail with reference to FIGS. 1 to 5. FIG. 1 is an axially sectional view showing an overall configuration of the generator motor according to the first example of the invention. FIG. 2 is an exploded view showing an oil passage inside a bracket in the generator motor according to the first example. FIG. 3 is a sectional view showing the relation between armature windings and the positions of oil injection holes in the generator motor according to the first example. FIG. 4 is an axially vertical sectional view, which is a sectional view taken along the line of arrows A-A' in FIG. 1, showing a housing and an auxiliary oil reservoir portion in the generator motor according to the first example. FIG. 5 is a view showing a measurement result of the temperature distribution of the armature windings in the generator motor according to the first example.

In FIG. 1, a rotor 130 has a configuration in which a plurality of magnet insertion holes 132 and permanent magnets 133 provided inside the magnet insertion holes 132 are disposed inside a rotor core 131 provided on a shaft 6. Here, each of the permanent magnets 133 is a flat plate sintered magnet containing a rare-earth element as a main component. In addition, bearings 5A and 5B are fixed to brackets 200 (consisting of brackets 200A and 200B). The shaft 6 is supported rotatably by the bearings 5A and 5B. Thus, the rotor 130 is supported rotatably by the bearings 5A and 5B.

In FIG. 1 and FIG. 3, a stator 1 is provided with a large number of stator slots 111 (twelve in the example of the invention) provided in a stator core 110. Armature windings 14 corresponding to phases of U-phase coils, V-phase coils and W-phase coils are buried in the slots 111. A plurality of insulated copper wires (not shown) are bundled and formed into one coil. This coil is wound at least one turn. In addition, the armature windings 14 are wound as concentrated windings to surround teeth 112 adjacent to the slots 111 respectively. In order to prevent the windings from being detached, magnetic pole pieces 113 are provided on inner circumferential ends of the teeth 12 respectively. Each of slot opening portions 114 is provided between adjacent ones of the magnetic pole pieces 113. The copper wires are inserted from the slots 114 to form the armature windings 14.

In FIG. 1 and FIG. 4, the stator 1 is fixed to the inner circumferential side of a cylindrical housing 18 by shrinkage fitting or press fitting. In addition, two auxiliary oil reservoir portions 8 (consisting of auxiliary oil reservoir portions 8A and 8B) communicating with a primary oil reservoir portion 7 through fine holes 16 provided in center portions of the auxiliary oil reservoir portions 8 are provided on the outer circumferential side and the axially outer sides of the stator core 110 in the housing 18. The auxiliary oil reservoir portions 8 are filled with cooling oil 10. Here, it is desirable that the oil level of the cooling oil 10 is high enough to come in contact with the outer diameter of the rotor 130. However, the oil level of the cooling oil 10 may be designed to be not high enough to come in contact with the outer diameter of the rotor 130.

In FIG. 1, FIG. 2 and FIG. 3, an oil groove 202 communicating with an oil passage 201 provided in a vertically upper portion of the bracket 200 is provided concentrically in the bracket 200. In addition, a ring 203 provided with oil injection holes 204 is fixed to cover the oil groove 202. Here, the oil injection holes 204 provided in the ring 203 are disposed at equal pitches to those of the teeth 112 and provided to be opposed to the armature windings 14 (in particular, winding ends: coil ends). The oil injection holes 204 are arranged to be dense (five in the example of the invention) in the vertically upper portion of the bracket 200 and sparse (zero in the example of the invention) in a horizontal direction of the bracket 200. Incidentally, the oil injection holes 204 may be provided not in the ring 203 but in the bracket 200. Further, the oil injection holes 204 are not limited to the example depicted in FIG. 3. When there are a large number of winding ends of the armature windings 14, an injection hole 204 may be provided for each winding end in the vertically upper portion, an injection hole 204 may be provided for every two winding ends under the vertically upper portion, and an injection hole 204 may be further provided for every three winding ends at the same height as the shaft 6.

In other words, the flow rate distribution of the cooling oil with which the cooling oil 10 is injected from a plurality of injection holes 204 is set so that the flow rate of the cooling oil from the brackets 200A and 200B on the opposite sides toward the winding ends of the armature windings 14 is higher at a position higher than the level of the shaft 6. In the example of the invention, the setting method is defined based on the number of injection holes 204. Incidentally, the aforementioned method for setting the flow rate distribution of the cooling oil is also shared among other examples.

Here, in the configuration example depicted in FIG. 3, no oil injection hole 204 is provided either in any horizontal portion of the ring 203 or in any lower portion of the ring 203. Although the details will be given later, the cooling oil injected from the oil injection holes 204 in the upper portion can flow down to cool down the armature windings corresponding to the horizontal portions and the lower portion of the ring 203.

In addition, an oil pipe 300 is connected between each auxiliary oil reservoir portion 8A, 8E and an oil pump 301, between the oil pump 301 and an oil cooler 302 and between the oil cooler 302 and each oil passage 201 provided in the brackets 200 respectively. When the oil pipe 300 is connected in this manner, the cooling oil 10 reserved in the auxiliary oil reservoir portions 8A and 8B can be pumped up by the oil pump 301, cooled down by the oil cooler 302 and then circulated back to the oil passages 201A and 202B. Since the oil passages 201A and 201B communicate with the oil grooves 202A and 202B and the oil injection holes 204A and 204B provided in the rings 203A and 2033, the oil can be injected from the axially opposite sides to the armature windings 14.

FIG. 5 is a graph showing a measurement result of the temperature distribution of the armature windings in the generator motor according to the first example. FIG. 5 is depicted for comparison of the temperature distribution according to the example of the invention with the temperature distribution according to a comparative example. The depiction of FIG. 5 is normalized with the maximum temperature in the cooling method according to the comparative example as 100%. In the cooling method according to the comparative example, injection holes 204 provided in the ring 203 are disposed in the whole circumference at equal intervals.

As apparent from FIG. 5, it can be known that, in the case of the cooling method according to the comparative example, a difference up to about 90% appears in the temperature distribution of the armature windings and particularly a conspicuous difference appears between 0° (corresponding to a vertically top portion of the bracket 200) and 90° or 270° (corresponding to the horizontal direction of the bracket 200) as to the circumferential positions of the armature windings. The reason can be analyzed and considered as follows. That is, as to the pressure distribution among the oil injection holes 204, the pressure in any injection hole in the upper portion in the comparative example in which the injection holes are provided in the whole circumference is lower than that in the example of the invention in which the injection holes are provided only in the upper portion (the pressure distribution of the injection holes in the upper portion increases due to absence of injection holes in the lower half of the stator in the example of the invention). Thus, due to reduction in injection flow rate, the temperature at a position around 0° is increased. In addition, synergistic cooling is achieved in the horizontal direction by the cooling oil from the injection holes and the cooling oil flowing down from the vertically upper portion.

In the example of the invention, the generator motor 12 is configured as described above. As a result, the difference of the circumferential temperature distribution is reduced greatly so that the temperature distribution is mostly uniform as indicated by the solid line in FIG. 5. To explain the reason, the injection holes 204 provided in the ring 203 are provided at equal pitches to those of the teeth 112 and oppositely to the armature windings 14, and arranged to be dense in the vertically upper portion of the bracket 200 and sparse in the horizontal direction of the bracket 200. Accordingly, the cooling oil can be injected directly to the armature windings 14 in the vertically upper portion concentratedly and with a large quantity (to directly cool down the coil ends which are heating elements), so that the temperature at a position around 0° in terms of the circumferential positions of the armature windings can be reduced.

In addition, since no injection hole 204 is disposed in the horizontal direction (in the vicinity of 90° or 270° at the circumferential position), cooling is performed by only the cooling oil flowing down from the vertically upper portion. As a result, circumferentially uniform cooling can be performed. Here, it is a matter of course that the aforementioned effect can be obtained likewise on the axially opposite sides because the rings 203 are disposed on the axially opposite sides (refer to the oil injection holes 204A and 204B disposed on the left and right opposite sides shown in FIG. 1).

Further, in the example of the invention, the flow rate of the cooling oil to be injected is made high in the upper portion, and made a little in the side portions. Accordingly, the flow rate as a whole can be suppressed to the minimum.

Accordingly, there is a merit that the motive power of the oil pump 301 can be reduced to contribute to energy saving of the drive system.

In addition, as another feature of the example of the invention, the cooling oil 10 to be circulated is pumped up from the auxiliary oil reservoir portions 8. That is, the oil reservoir portion for reserving the cooling oil 10 is constituted by the primary oil reservoir portion 7 and the auxiliary oil reservoir portions 8 connected to the primary oil reservoir portion 7 through the fine holes 16 respectively, and the oil pipe 300 is inserted into the auxiliary oil reservoir portions 8. Accordingly, even when an electric construction machine (not shown) performs operation on a sloping land and the oil level of the primary oil reservoir portion 7 is tilted, the cooling oil 10 can be circulated stably. To further explain, even when a hydraulic excavator or a wheel loader (represented by the hydraulic excavator hereinafter) mounted with the generator motor according to the example of the invention is tilted to the left/right or to the front/rear, the fine holes 16 (small diameter passages) are provided in the center portions of the auxiliary oil reservoir portions 8 so that the cooling oil can be circulated. With the provision of the fine holes 16, air can be prevented from entering the auxiliary oil reservoir portions 8 even when the hydraulic excavator is tilted. In other words, the fine holes 16 are provided at heights and positions where air can be prevented from entering the auxiliary oil reservoir portions 8 even when the generator motor is tilted.

Incidentally, the relation between the generator motor according to the example of the invention and the hydraulic excavator will be described in detail later in the description of FIGS. 13 to 15. In FIG. 15, a generator motor 50 is placed in a limited small space between an engine 51 including an internal combustion engine portion 512 and a flywheel 511 and a hydraulic pump 52 formed by a gear 521 and a hydraulic mechanism portion 522. The generator motor 50 serves as an electric motor which supplies auxiliary motive power required for driving the hydraulic pump 52 together with the engine 51 and serves as a generator which converts the mechanical output of the engine 51 into an electric output and supplies electric power to another electric apparatus (not shown).

As described above, the generator motor is configured as shown in FIGS. 1 to 5. With this configuration, the armature windings wound around the stator can be uniformly cooled down in the circumferential direction of the stator. Thus, it is possible to provide a cooling configuration of a generator motor for an electric construction machine with a high cooling effect.

Example 2

Figure 6:
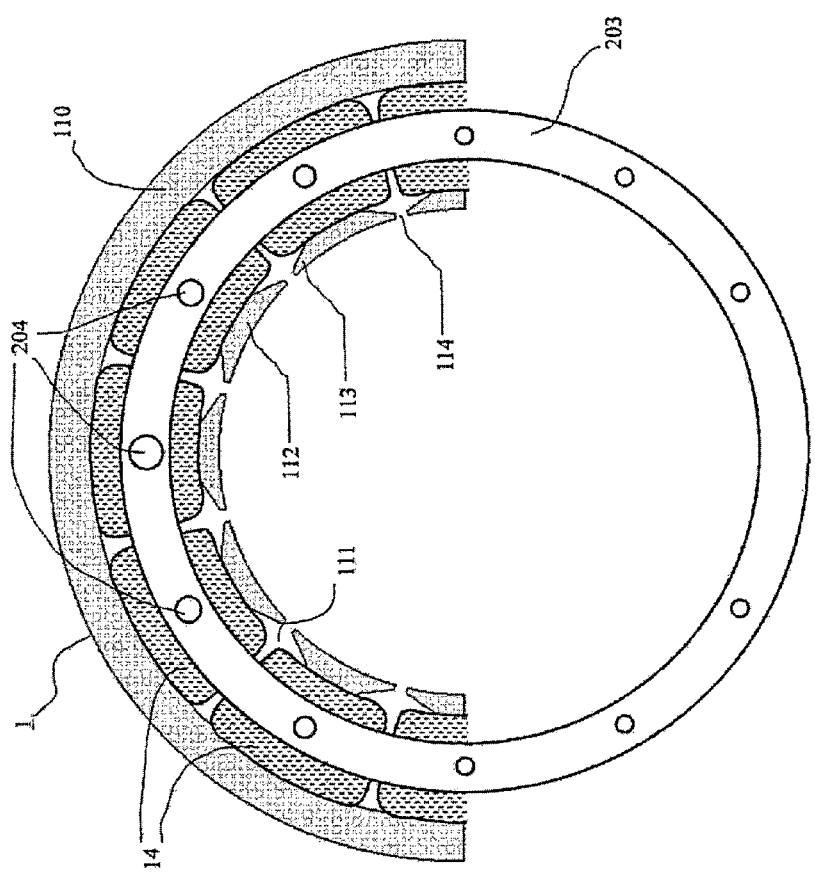
FIG. 6 A sectional view showing the relation between armature windings and the hole diameters of oil injection holes in a generator motor according to a second example of the invention.

A generator motor according to a second example of the invention will be described below with reference to FIG. 6. FIG. 6 is a sectional view showing the relation between armature windings and the hole diameters of oil injection holes in the generator motor according to the second example. In FIG. 6, the same constituent elements as those in FIG. 3 are referred to by the same numerals correspondingly so that duplicate description thereof will be avoided.

The second example is different from the first example shown in FIG. 3 in the point that the oil injection holes 204 provided in the ring 203 are disposed in the whole circumference so that the hole diameters of the oil injection holes 204 are large in the vertically upper portion, small in the horizontal direction and small in the vertically lower portion. In other words, the second example is an example in which, of the hole diameters of the injection holes 204 provided in the bracket 200, one in the vertically upper portion of the bracket 200 is made large but ones located at positions closer to the level of the shaft 6 are made smaller gradually.

In the example depicted in FIG. 6, small holes are provided in the horizontal direction and the vertically lower portion of the ring 203. Thus, based on cooling by both the oil injected from these small holes and the cooling oil flowing down from the vertically upper portion, an equivalent cooling effect to that performed on the opposed armature windings 14 in the vertically upper portion can be obtained. Although no small hole is provided in the lowest portion of the ring 203 in FIG. 6, the configuration shown in FIG. 6 belongs to the scope of the technical idea mentioned in the example of the invention in which oil injection holes having different hole diameters are provided in the whole circumference.

Example 3

Figure 7:
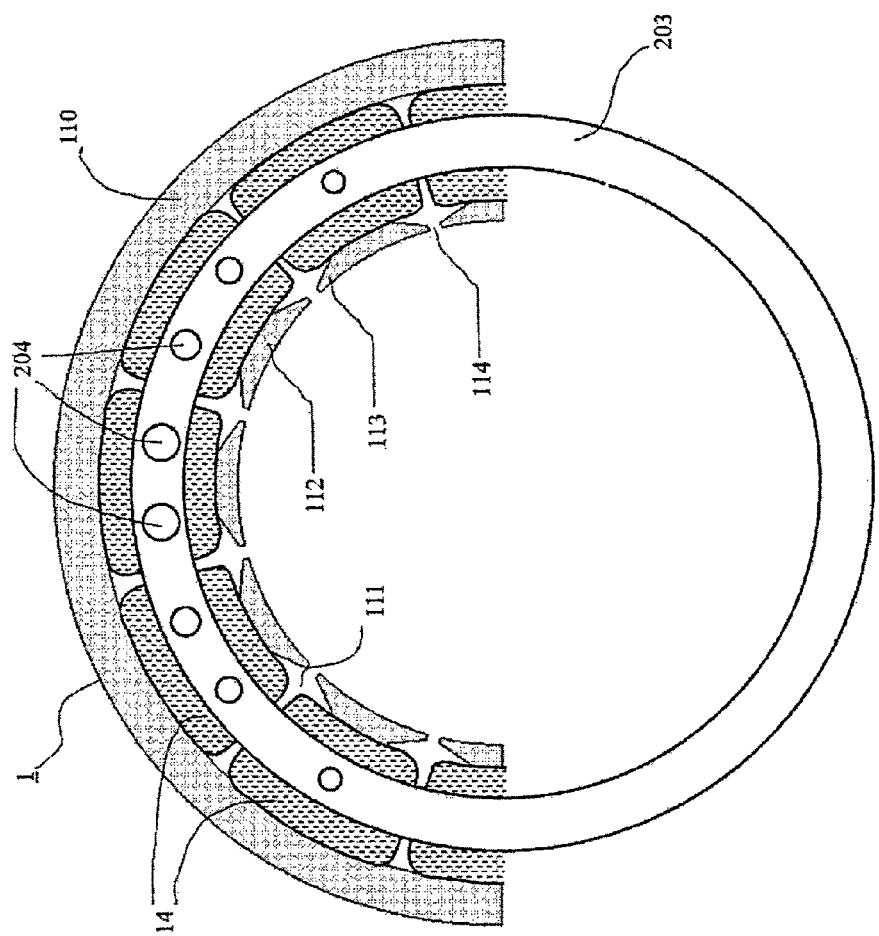
FIG. 7 A sectional view showing the relation between armature windings and the number and the hole diameters of oil injection holes in a generator motor according to a third example of the invention.

A generator motor according to a third example of the invention will be described below with reference to FIG. 7. FIG. 7 is a sectional view showing the relation between armature windings and the number and the hole diameters of oil injection holes in the generator motor according to the third example. In FIG. 7, the same constituent elements as those in FIG. 3 are referred to by the same numerals correspondingly so that duplicate description thereof will be avoided.

The third example is different from the first example shown in FIG. 3 in the point that the oil injection holes 204 are provided so that the number of the oil injection holes 204 provided in the ring 203 is large in the vertically upper portion and reduced in the horizontal direction and the hole diameters of the oil injection holes 204 are large in the vertically upper portion and small in the horizontal direction.

Incidentally, although FIG. 7 depicts the example in which the hole diameters of the injection holes are made large in the case where the number of the injection holes is large, and made small in the case where the number of the injection holes is small, the invention is not limited to thereto. Another configuration example may be made without limitation on the size of each hole diameter. That is, the number of injection holes provided at positions opposite to the winding ends of the armature windings is made large in the vertically upper portion of the bracket and reduced gradually at positions closer to the level of the shaft.

According to the configuration shown in FIG. 7, the same effect as that in FIG. 3 can be obtained and particularly the cooling effect in the vertically upper portion can be further enhanced.

Example 4

Figure 8:
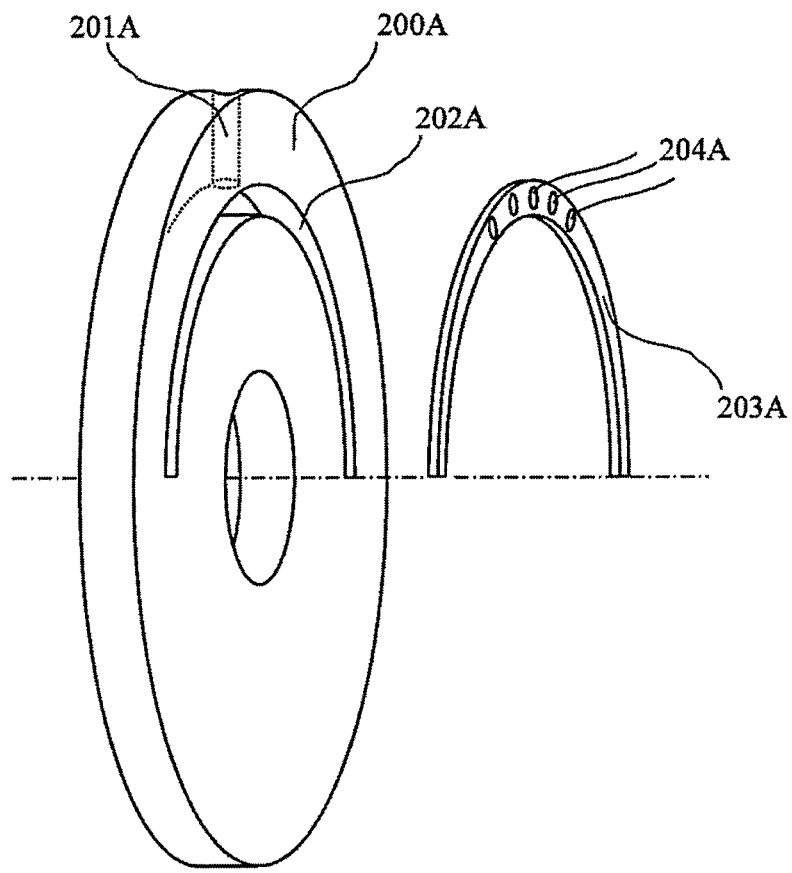
FIG. 8 An exploded view showing an oil passage inside a bracket in a generator motor according to a fourth example of the invention.
Figure 9:
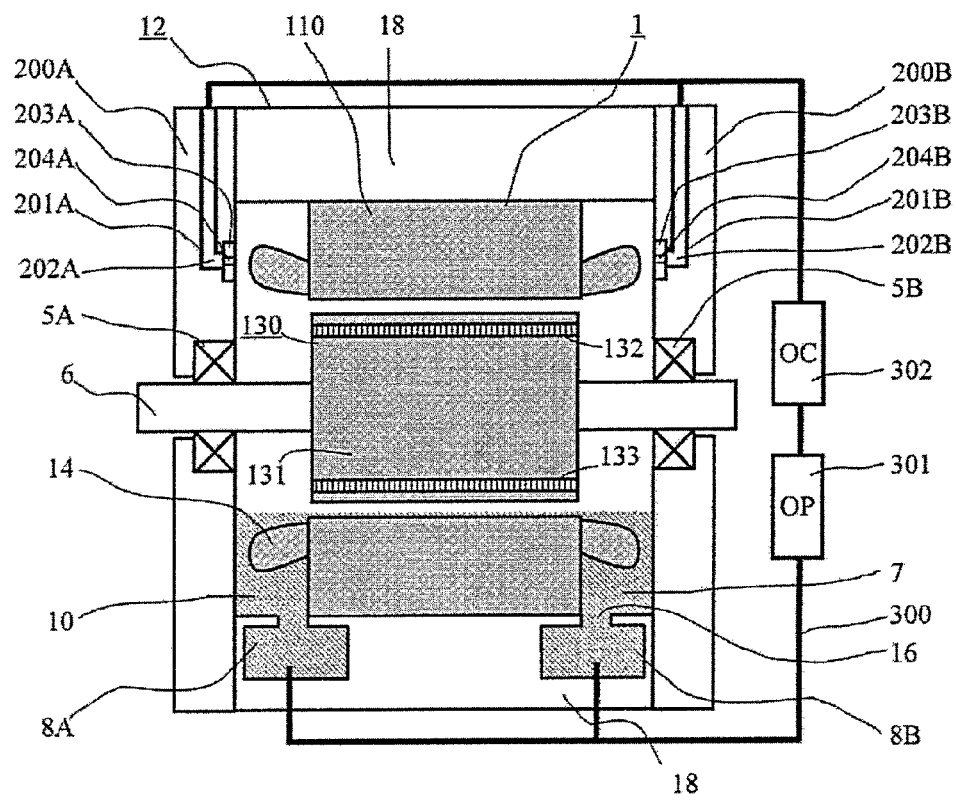
FIG. 9 An axially sectional view showing an overall configuration of the generator motor according to the fourth example.

A generator motor according to a fourth example of the invention will be described below with reference to FIG. 8 and FIG. 9. FIG. 8 is an exploded view showing an oil passage inside a bracket in the generator motor according to the fourth example of the invention. FIG. 9 is an axially sectional view showing an overall configuration of the generator motor according to the fourth example. In FIG. 8 and FIG. 9, the same constituent elements as those shown in FIG. 1 and FIG. 2 are referred by the same numerals correspondingly so that duplicate description thereof will be avoided.

The fourth example shown in FIG. 8 and FIG. 9 is different from the first example shown in FIG. 1 and FIG. 2 in the point that an oil groove 202 provided in a bracket 200 and a ring 203 are arranged to be shaped like an arc extending from a vertically upper portion toward a horizontal direction, and the oil level of cooling oil 10 reserved in a primary oil reservoir portion 7 is set up to the inner diameter of a stator 1 (see FIG. 9).

According to the configuration as shown in FIG. 8 and FIG. 9, an effect of cooling armature windings 14 in the vertically upper portion can be obtained in the same manner as in FIG. 1 and FIG. 2. Cooling in a vertically lower portion is achieved by oil in the primary oil reservoir portion 7 and oil flowing down from the upper portion. Due to this configuration, the circulatory pressure of an oil pump 301 can be more reduced so that energy consumption of the drive system can be more reduced.

Example 5

Figure 10:
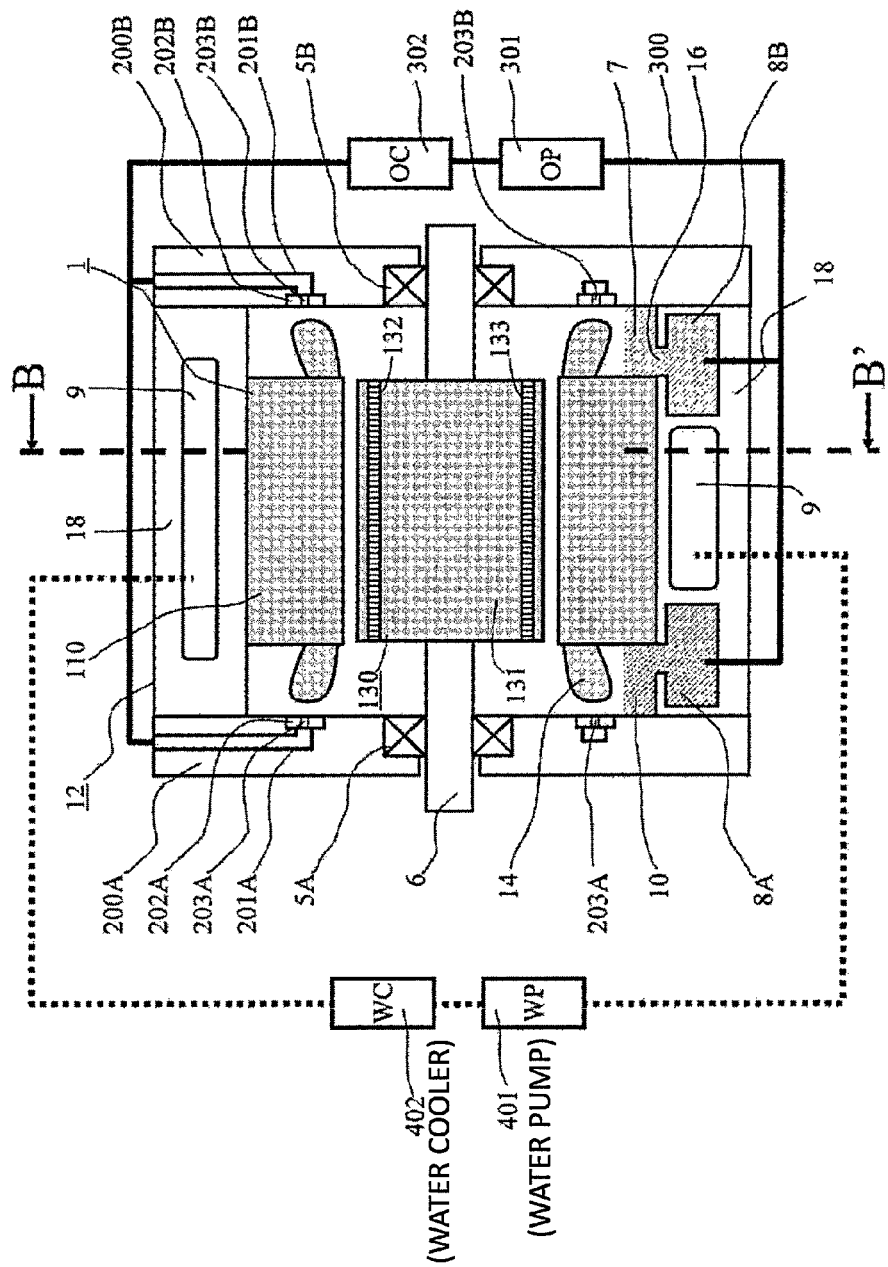
FIG. 10 An axially sectional view showing a cooling waterway in a housing in a generator motor according to a fifth example of the invention.
Figure 11:
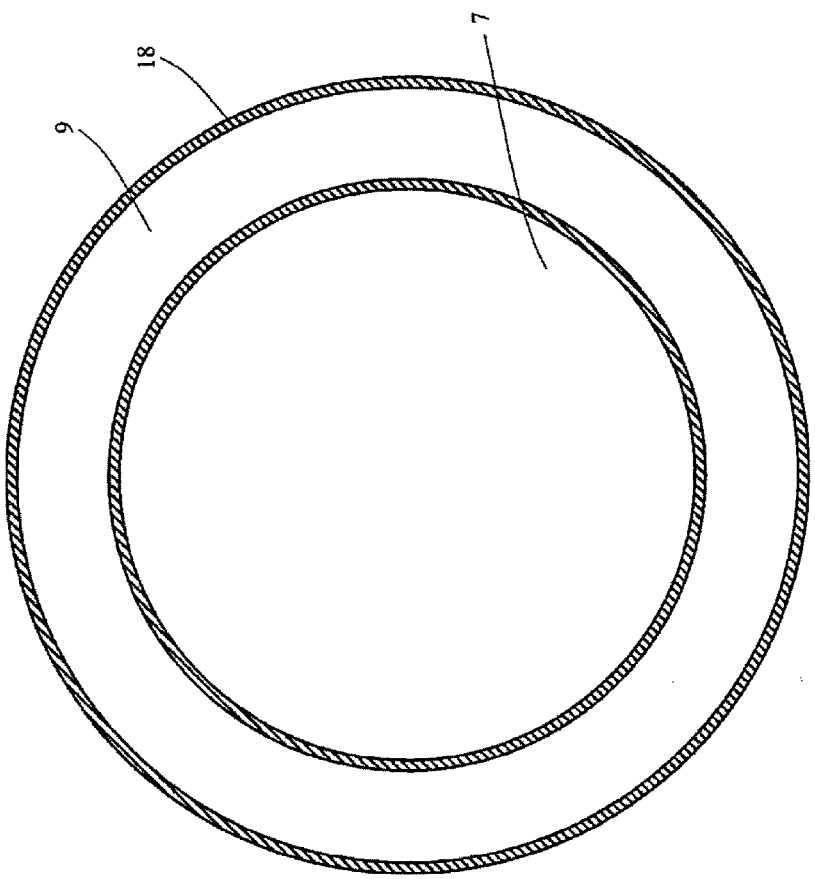
FIG. 11 An axially vertical sectional view, which is a sectional view taken along the line of arrows B-B' in FIG. 10, showing the housing and the cooling waterway in the generator motor according to the fifth example.

A generator motor according to a fifth example of the invention will be described below with reference to FIG. 10 and FIG. 11. FIG. 10 is an axially sectional view showing a cooling waterway inside a housing in the generator motor according to the fifth example of the invention. FIG. 11 is an axially vertical sectional view, which is a sectional view taken along the line of arrow B-B' in FIG. 10, showing the housing and the cooling waterway in the generator motor according to the fifth example. The same constituent elements as those in FIG. 1 are referred by the same numerals correspondingly so that duplicate description thereof will be avoided.

The fifth example is different from the first example shown in FIG. 1 in the point that a cooling waterway 9 is provided in a housing 18. Here, the cooling waterway 9 forms an annular passage in the circumferential direction of the housing 18. Thus, a circulatory passage in which water is circulated by an external water pump 401 and cooled down by a water cooler 402 is formed.

The cooling waterway 9 in the fifth example is disposed on the outer diameter side of a stator core 110. Accordingly, the cooling waterway 9 can cool down iron loss generated in the stator core 110 and cool down copper loss generated in armature windings 14 indirectly through the stator core 110. In addition, the cooling waterway 9 can contribute to cooling of cooling oil 10 reserved in auxiliary oil reservoir portions 8 in the bottom portion of the housing 18.

In the other words, cooling water in the cooling waterway 9 can cool down the stator 1 and the cooling oil 10 indirectly. Accordingly, the cooling water in the cooling waterway 9 can improve the efficiency of the generator motor and further reduce the flow rate of the cooling oil circulated by an oil pump 301 to thereby contribute to energy saving of the drive system and reduction in fuel consumption. In addition, the oil cooler 302 can be miniaturized or dispensed with to thereby contribute to miniaturization of the system and improvement in reliability derived from reduction in the number of components.

Example 6

Figure 12:
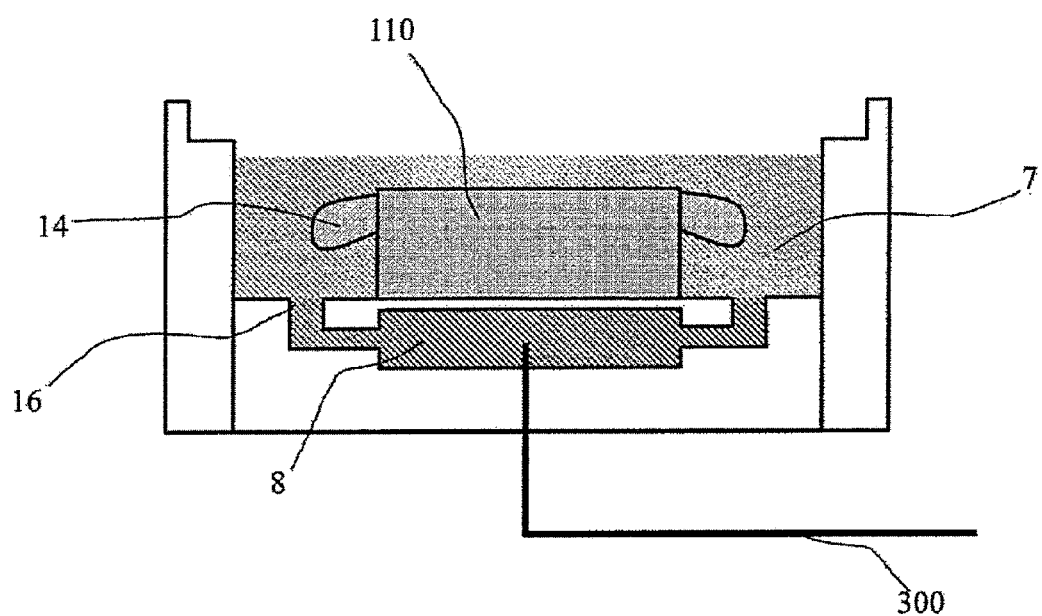
FIG. 12 An axially sectional view showing the structure of an auxiliary oil reservoir portion in a generator motor according to a sixth example of the invention.

A generator motor according to a sixth example of the invention will be described below with reference to FIG. 12. FIG. 12 is an axially sectional view showing the structure of an auxiliary oil reservoir portion in the generator motor according to the sixth example of the invention. In FIG. 12, the same constituent elements as those in FIG. 1 are referred to by the same numerals correspondingly so that duplicate description thereof will be avoided.

The sixth example of the invention is different from the first example shown in FIG. 1 in the point that the auxiliary oil reservoir portion 8 provided in the bottom portion of the housing 18 is formed as a single structure.

According to the configuration of the fifth example shown in FIG. 11, the influence of change in the oil level of cooling oil can be further reduced even when an electric vehicle mounted with the generator motor according to the example of the invention is tilted. Thus, the cooling oil can be circulated stably and the number of places from which the oil pipe 300 branches can be reduced. Accordingly, it is possible to contribute to simplification of the oil pipe 300 and improvement in the reliability derived from the reduction of the number of connection places.

Example 7

A hydraulic excavator to which a generator motor according to a seventh example of the invention is applied will be described below with reference to FIGS. 13 to 15. FIG. 13 is a rough sketch showing the outline of the hydraulic excavator to which the generator motor according to the seventh example is applied. FIG. 14 is a view showing a state in which the hydraulic excavator to which the generator motor according to the seventh example is applied performs operation on a sloping land. FIG. 15 is a view of a sectional configuration of an engine room in the hydraulic excavator to which the generator motor according to the seventh example is applied.

Figure 13:
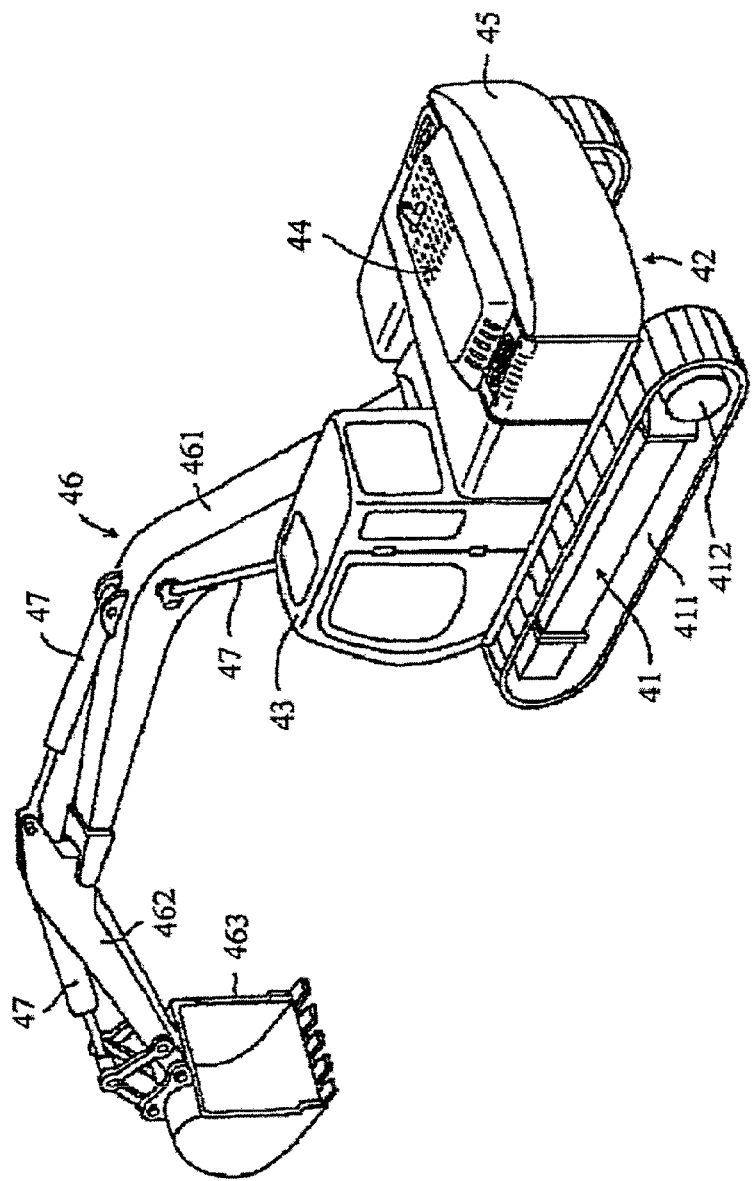
FIG. 13 A rough sketch showing the outline of a hydraulic excavator to which a generator motor according to a seventh example of the invention is applied.
Figure 14:
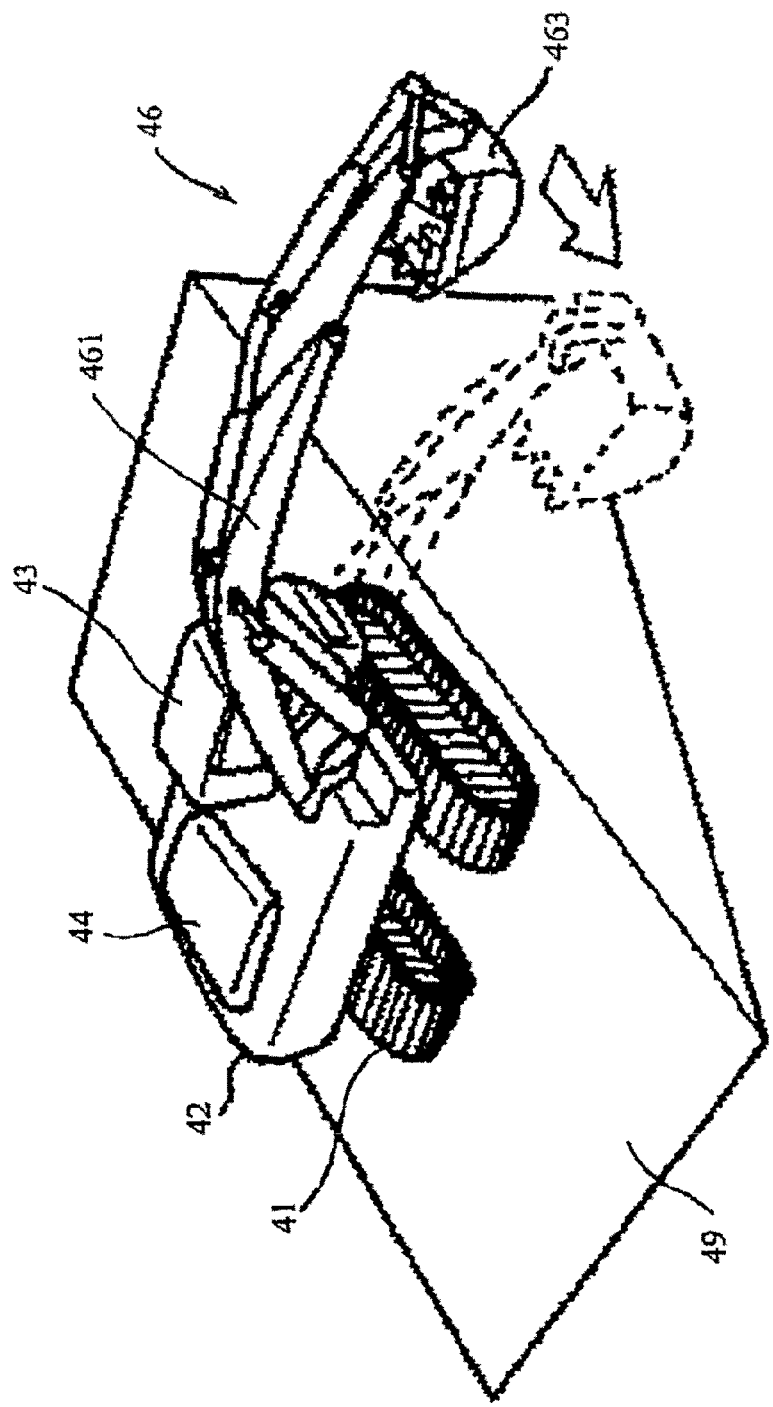
FIG. 14 A view showing a state in which the hydraulic excavator to which the generator motor according to the seventh example is applied performs operation on a sloping land.
Figure 15:
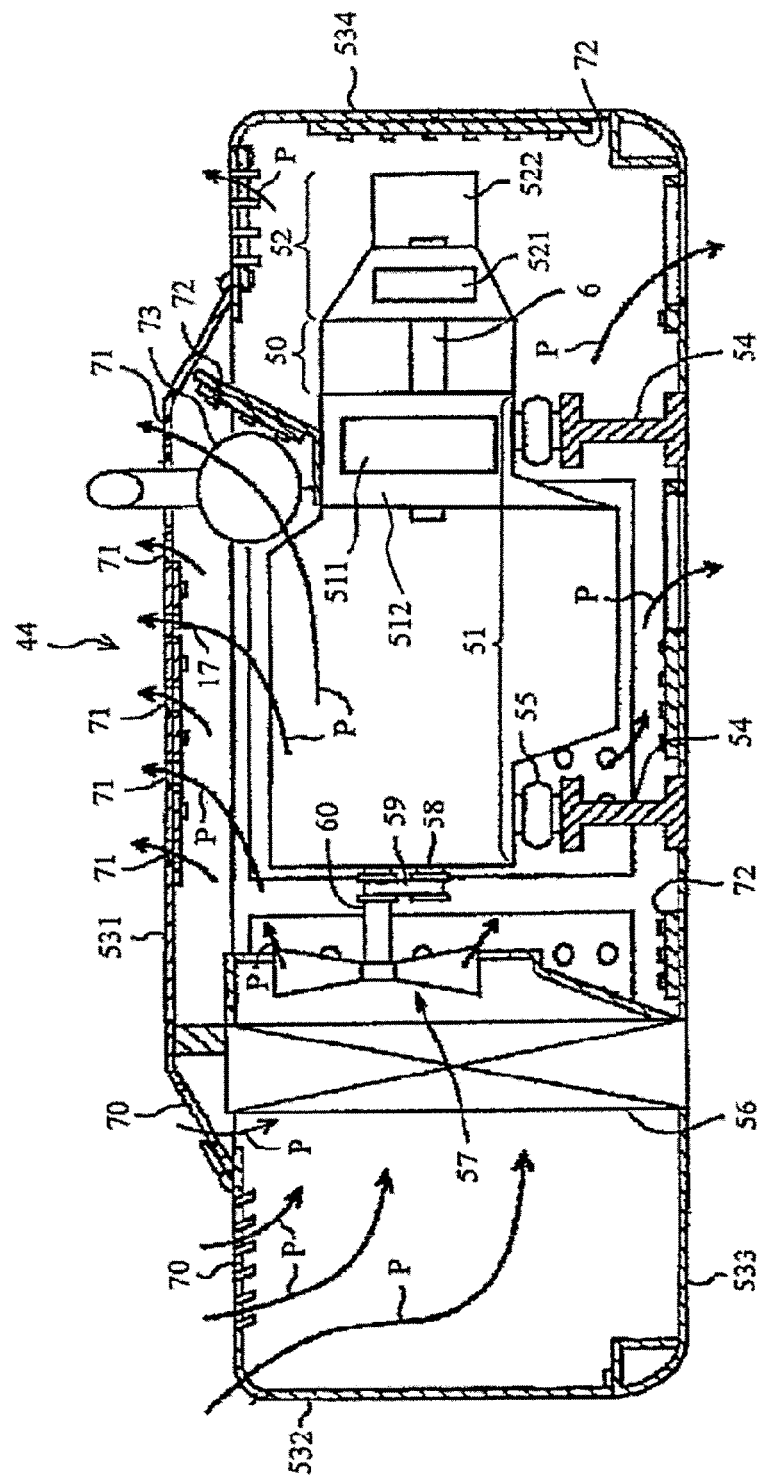
FIG. 15 A view of a sectional configuration of an engine room in the hydraulic excavator to which the generator motor according to the seventh example is applied.

In FIGS. 13 to 15, the hydraulic excavator includes an undercarriage 41, an upperstructure 42 which is provided rotatably on the undercarriage 41, an operator's cab 43 which is provided on the front left side of the upperstructure 42, an engine room 44 which is disposed sideways on the upperstructure 42, a counterweight 45 which is provided at the rear of the upperstructure 42, and a multi-joint type front device 46 which is provided in front of the upperstructure 42 and which includes a boom 461, an arm 462, and a bucket 463.

The undercarriage 41 is provided with caterpillar crawler belts 411 on the left and right, which belts are driven by driving powers of traveling motors 412 respectively. The upperstructure 42 provided with the engine room 44 and the multi-joint type front device 46, etc. is swung with respect to the undercarriage 41 by a not-shown swinging motor provided in a center portion of the upperstructure 42. The boom 461, the arm 462 and the bucket 463 constituting the multi-joint type front device 46 are driven and operated by a boom cylinder 47, an arm cylinder 47 and a bucket cylinder 47 provided respectively for the boom 461, the arm 462 and the bucket 463.

The aforementioned various cylinders 47, the travelling motors 412 and the swinging motor use hydraulic actuators so as to be driven by pressure oil from a control valve device which controls pressure oil from a hydraulic pump 52 (see FIG. 15) driven by an engine 51 and/or a generator motor 50 in the engine room 44 in response to an operation performed by an operator in the operator's cab 43.

Here, the generator motor 50 according to the seventh example uses any of the configurations shown in FIGS. 1 to 12 and has a configuration in which the generator motor 50 is applied as a drive source of the hydraulic pump 52 to the hydraulic excavator. The engine 51 including a flywheel 511 and an internal combustion engine portion 512 and the hydraulic pump 52 including a gear 521 and a hydraulic mechanism portion 522 are disposed on the side surface 200A and the side surface 200B of the brackets 200 of the generator motor shown in FIG. 1, through the shaft 6. That is, configuration is made so that the generator motor 50 used in the example of the invention is disposed to be interposed between the engine 51 and the hydraulic pump 52 through the brackets 200A and 200B.

The engine room 44 is provided with the engine 51, the generator motor 50 and the hydraulic pump 52. In addition, the engine room 44 is mainly provided with: a radiator 56 which cools down cooling water for the engine 51; a cooling fan 57 which generates cooling air P for cooling down the radiator 56; inlets 70 which introduce an air flow (cooling air) P to the cooling fan 57; outlets 71 which discharge the air flow P to the outside; a sound absorber 72; a crank shaft 58, a fan belt 59 and an auxiliary rotary shaft 60 which transmit rotation of the engine 51 to the cooling fan 57; a vibration damping unit 55 and a frame 54 on which the engine 51 is placed; a muffler 73 which absorbs sound of exhaust gas from the engine 51; and covers (an upper cover 531, an inlet-side lateral cover 532, a lower cover 533 and an outlet-side lateral cover 534) with which the various constituent elements are covered. In this manner, the generator motor 50 according to the seventh example is disposed in connection with the respective constituent elements in the engine room 44 on the upperstructure 42 in the hydraulic excavator as shown in FIG. 15.

When the hydraulic excavator to which the generator motor according to the seventh example is applied performs an excavation operation on a sloping land 49 as shown in FIG. 14, the undercarriage 41 first goes up on the sloping land 49 and the upperstructure 42 is then swung to carry out an operation in the state in which the engine room 44 is disposed sideways. In the example of the operation shown in FIG. 14, the generator motor according to the example of the invention is in a state in which the shaft 6 is not laid horizontally but tilted.

Even when the shaft (axis) 6 in the generator motor 50 mounted in the hydraulic excavator is tilted during operation, the auxiliary oil reservoir portions 8 are placed under the primary oil reservoir portion 7 and disposed in the lower portion of the generator motor (see FIG. 4). Thus, oil can be prevented from leaking from the auxiliary oil reservoir portions 8 shown in FIG. 1, FIG. 9 and FIG. 10, so as to avoid failure in sucking the oil to the oil pipe 301.

REFERENCE SIGNS LIST

1 . . . stator, 10 . . . cooling oil, 110 . . . stator core, 111 . . . slot, 112 . . . teeth, 113 . . . magnetic pole piece, 114 . . . slot opening portion, 12 . . . generator motor, 130 . . . rotor, 131 . . . rotor core, 132 . . . magnet insertion hole, 133 . . . permanent magnet, 14 . . . armature winding, 16 . . . fine hole, 18 . . . housing 200 . . . bracket, 201 . . . oil passage, 202 . . . oil groove, 203 . . . ring, 204 . . . oil injection hole, 300 . . . oil pipe, 301 . . . oil pump, 302 . . . oil cooler, 401 . . . water pump, 402 . . . water cooler, 41 . . . undercarriage, 411 . . . caterpillar crawler belt, 412 . . . travelling motor, 42 . . . upperstructure, 43 . . . operator's cab, 44 . . . engine room, 45 . . . counterweight, 46 . . . multi-joint type front device, 461 . . . boom, 462 . . . arm, 463 . . . bucket, 47 . . . cylinder, 49 . . . sloping land, 5 . . . bearing, 50 . . . generator motor, 51 . . . engine, 511 . . . flywheel, 512 . . . internal combustion engine portion, 52 . . . hydraulic pump, 521 . . . gear, 522 . . . hydraulic mechanism portion, 531 . . . upper cover, 532 . . . inlet-side lateral cover, 533 . . . lower cover, 534 . . . outlet-side lateral cover, 54 . . . frame, 55 . . . vibration damping unit, 56 . . . radiator, 57 . . . cooling fan, 58 . . . crank shaft, 59 . . . fan belt 6 . . . shaft, 60 . . . auxiliary rotary shaft, 7 . . . primary oil reservoir portion, 70 . . . inlet, 71 . . . outlet, 72 . . . sound absorber, 73 . . . muffler, 8 . . . auxiliary oil reservoir portion, 9 . . . cooling waterway, P . . . air flow (cooling air)

The invention claimed is:

1. A generator motor comprising: a stator which is fixed to an inner diameter side of a housing; a rotor which is disposed to be opposed to an inner circumferential side of the stator and which is supported by bearings rotatably; and armature windings which are wound around teeth of a stator core, which teeth are adjacent to slots; wherein:
   a passage through which a cooling medium flows and injection holes which communicate with the passage and which inject the cooling medium at positions opposite to winding ends of the armature windings are provided in each of brackets provided on a shaft of the rotor through the bearings;
   the cooling medium is injected from the injection holes of the brackets disposed on axially opposite sides of the shaft toward the winding ends of the armature windings; and
   the flow rate distribution of the cooling medium from the plurality of injection holes is set so that the flow rate of the cooling medium from any of the injection holes is higher as the position of the injection hole is higher above the level of the shaft and wherein:
   the number of injection holes provided at positions opposite to the winding ends of the armature windings is large in a vertically upper portion of each of the brackets and gradually smaller in a portion thereof closer to the level of the shaft.

2. A generator motor according to claim 1, wherein:
   the hole diameter of each of the injection holes is increased when the number of the injection holes is larger, and reduced when the number of injection holes is smaller.

3. A generator motor according to claim 1, wherein:
   the passage which is provided in each of the brackets and through which the cooling medium flows is formed into an arc shape extending from a top portion of the bracket to the level of the shaft; and
   the liquid level of a primary reservoir portion of the cooling medium provided below the shaft is set to reach the inner diameter side of the stator formed in a lowest portion.

4. A generator motor according to claim 1, wherein:
   an annular passage is provided circumferentially in the housing disposed on an outer circumferential side of the stator so that the annular passage forms a cooling waterway circulating cooling water.

5. A generator motor according to claim 1, wherein:
   a reservoir portion of the cooling medium is provided in a bottom portion of the housing;
   the reservoir portion includes a primary reservoir portion formed at a position of a lower portion corresponding to the stator core, and an auxiliary reservoir portion which is provided under the primary reservoir portion so as to communicate therewith through a fine hole; and
   the cooling medium is pumped up from the auxiliary reservoir portion by an oil pump provided outside the generator motor, and supplied to the passage of the cooling medium in a vertically upper portion of each of the brackets through an oil cooler.

6. An electric vehicle comprising: a generator motor according to claim 1; an engine which has an internal combustion engine portion connected to a shaft of the generator motor; and a hydraulic pump which has a hydraulic mechanism portion connected to the shaft of the generator motor and disposed on an opposite side to the engine.

* * * * *